United States Patent [19]
Bruel

[11] 3,889,454
[45] June 17, 1975

[54] GRAPE AND JUICE RECOVERING DEVICE TO BE FITTED TO A GRAPE-GATHERING MACHINE

[76] Inventor: Alain Bruel, Domaine du Petit Chaumont, Aigues Mortes, France

[22] Filed: June 7, 1973

[21] Appl. No.: 367,904

[30] Foreign Application Priority Data
June 7, 1972 France ............... 72.21141

[52] U.S. Cl. ................................................. 56/330
[51] Int. Cl. ............................................ A01g 19/00
[58] Field of Search ............ 56/327, 328, 330, 331, 56/27.5

[56] References Cited
UNITED STATES PATENTS

| | | |
|---|---|---|
| 3,439,482 | 4/1969 | Orton.................................. 56/330 |
| 3,449,895 | 6/1969 | Pertics................................. 56/330 |
| 3,601,965 | 8/1971 | Kaessbohrer........................ 56/330 |
| 3,636,688 | 1/1972 | Fontan et al........................ 56/330 |
| 3,686,842 | 8/1972 | Littau .................................. 56/330 |

Primary Examiner—Russell R. Kinsey
Attorney, Agent, or Firm—Sughrue, Rothwell, Mion, Zinn and Macpeak

[57] ABSTRACT

A plurality of overlapping, rotatable, notched discs are disposed in two rows, one on each side of a row of vines, on pivoted arms. The vine stocks will pass between the two rows of discs which are inclined in parallel planes. The pivoted arms which support opposed discs are interconnected for common lateral movement to compensate for misalignment of the vines in a row.

8 Claims, 10 Drawing Figures

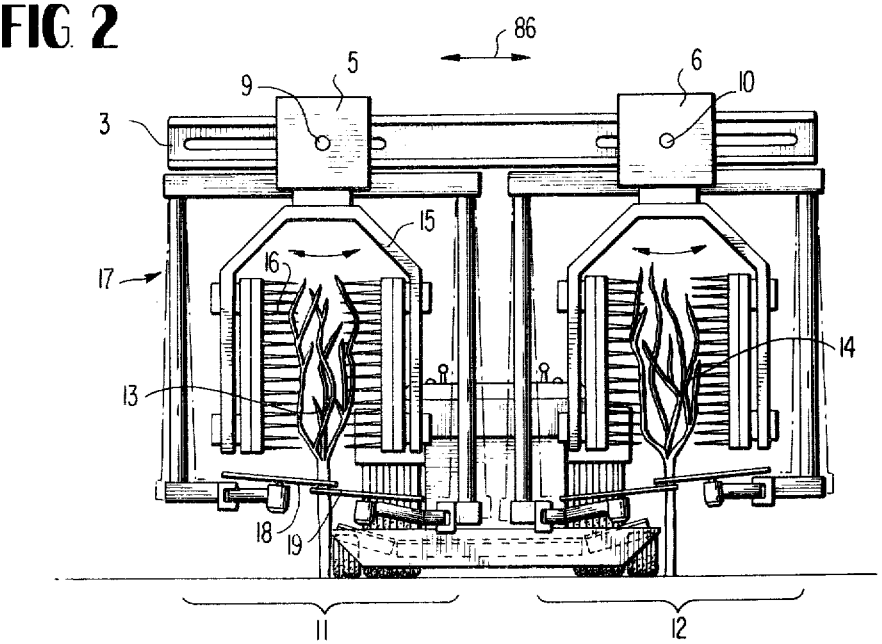
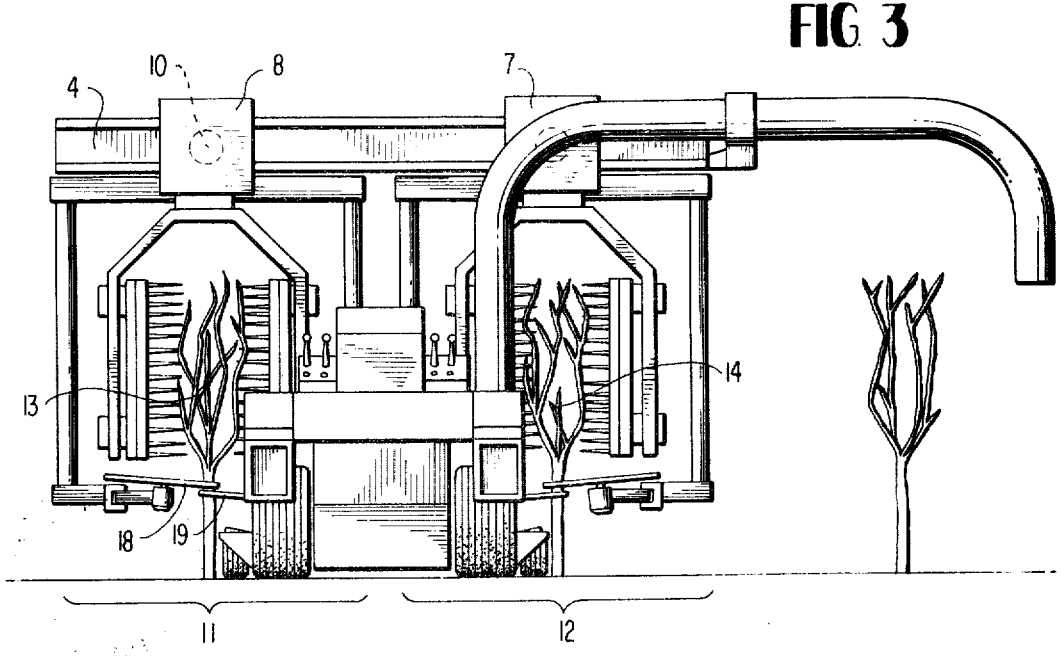

3,889,454

PATENTED JUN 17 1975　3,889,454

SHEET 4

GRAPE AND JUICE RECOVERING DEVICE TO BE FITTED TO A GRAPE-GATHERING MACHINE

The present invention relates to a grape recovering device to be fitted to a grape gathering machine.

It is known to construct a grape gathering machine in the shape of one or more tunnels, each of which tops one row of vine stocks along which it is moved. Such a tunnel includes mechanical or pneumatic beater members which act on either side of the vine stocks to pluck the grapes therefrom. As the grapes fall down, a recovering device is provided, level with the ground, to receive the vintage and direct it to discharge means.

It is necessary, however, that the recovering device disposed level with the ground provides a relatively tight fit around the foot of every vine stock. Such a sealing contrivance must open automatically before each vine stock is engaged by the machine, and then close around the foot of said stock.

The recovering devices of known types have various drawbacks. Some of them are not tight enough, and let too many grapes fall onto the ground. Others exert substantial stresses on each vine stock, whereby the stocks are injured and damaged. Lastly, no known device operates with a sufficient versatility to make up for the stock planting irregularities in vineyards, that is, to adapt itself to a row or rows wherein the vine stocks are not accurately aligned behind each other.

The object of the present invention is to obviate such drawbacks by providing a recovering device to be fitted to a grape gathering machine, which device ensures an adequate tightness without injuring the vine stocks, and adapts itself, besides, to the positions of said stocks automatically, even if the latter are not accurately aligned.

A grape recovering device for a grape gathering machine according to the invention is characterized in that it includes at least one swinging frame in the shape of a downwardly open U, which is supported at its upper portion with the lower ends of the two arms on either side of a vine stock. The lower end of each arm has a substantially vertical pivot pin on which a lever pivots, the free end of said lever carrying in turn a pin on which a disk rotates freely, said sealing disk being slightly inclined with respect to the horizontal, and carrying peripheral notches intended to come and engage against the foot of a vine stock, while the notches of the other disk come and engage against the opposite side of said foot.

According to another feature of the invention, the two notched disks or scales of the swinging frame overlap each other in the same plane which is slightly inclined with respect to the horizontal, so that the grapes which fall on said scales discharge laterally by themselves, under their own wieght.

According to another feature of the invention, with the swinging frame disposed transversely with respect to the direction of the forward motion of the grape gathering machine, the vintage produce collected by the recovering disks or scales is discharged onto the side of the row of vine stocks.

According to another feature of the invention, the swinging frame is provided with a transmission gear between the two scale-carrying pivoting levers, so that, when one of the levers moves its scale, for instance, in the direction of the other arm of the swinging frame, the other lever moves its scale in the same direction, that is, the free section defined between the opposite notches of the two scales is kept substantially constant, said free section being used to allow the foot of a vine stock to pass. Owing to this arrangement, the stock is subjected to minimum stresses, so that the device according to the invention does not injure the stocks.

According to another feature of the invention, the swinging frame is able, to swing about the upper shaft or traveller from which it is hanging.

According to an additional feature of the invention, a plurality of swinging frames of the above-mentioned type are suspended behind one another from a single upper longitudinal shaft or traveller, so that they define a tunnel or channel capable of topping a row of vines, while the swinging frames constituting said tunnel are able to swing independently from each other.

According to an additional feature of the invention, two travellers of the above-mentioned type are mounted on a single grape gathering machine, said travellers being directed lengthwise and side by side, while each of them supports a tunnel provided with recovering disks or scales, so that said gathering machine can work or two rows of vine stocks simultaneously.

According to a further feature of the invention, each recovering scale is constituted by a disk of sheet steel coated with a material capable of withstanding continuous shocks and frictions, such as polyurethan, super-polyamide ("Nylon"), synthetic rubber, or the like.

According to a further feature, each scale is constituted by a steel disk having six notches, said notches being defined by the bottoms of six teeth, the shape of which is similar to that of a ratchet wheel, so that every disk presents a notch when a new vine stock is topped by the machine, and turns by itself as the machine moves forward with respect to said vine stock.

According to a further feature, said automatic rotary motion of the scales and the dip of the plane thereof with respect to the horizontal are used for ensuring the transfer of the vintage to the side of the tunnel or channel automatically.

According to a modification, each disk or scale has one of its surfaces provided with a rubber disk having a protruding lip, which improves the tightness and ensures a perfect recovery both of the grapes and the juice.

The appended drawing, given by way of non-limiting example, will enable the features of the invention to be more clearly understood.

FIG. 2 is a front elevational view thereof, viewed in the direction of line II—II of FIG. 1 with the tow bar disconnected from the machine.

FIG. 3 is a rear view of same, in the direction of the arrow III of FIG. 1.

Figure 1:
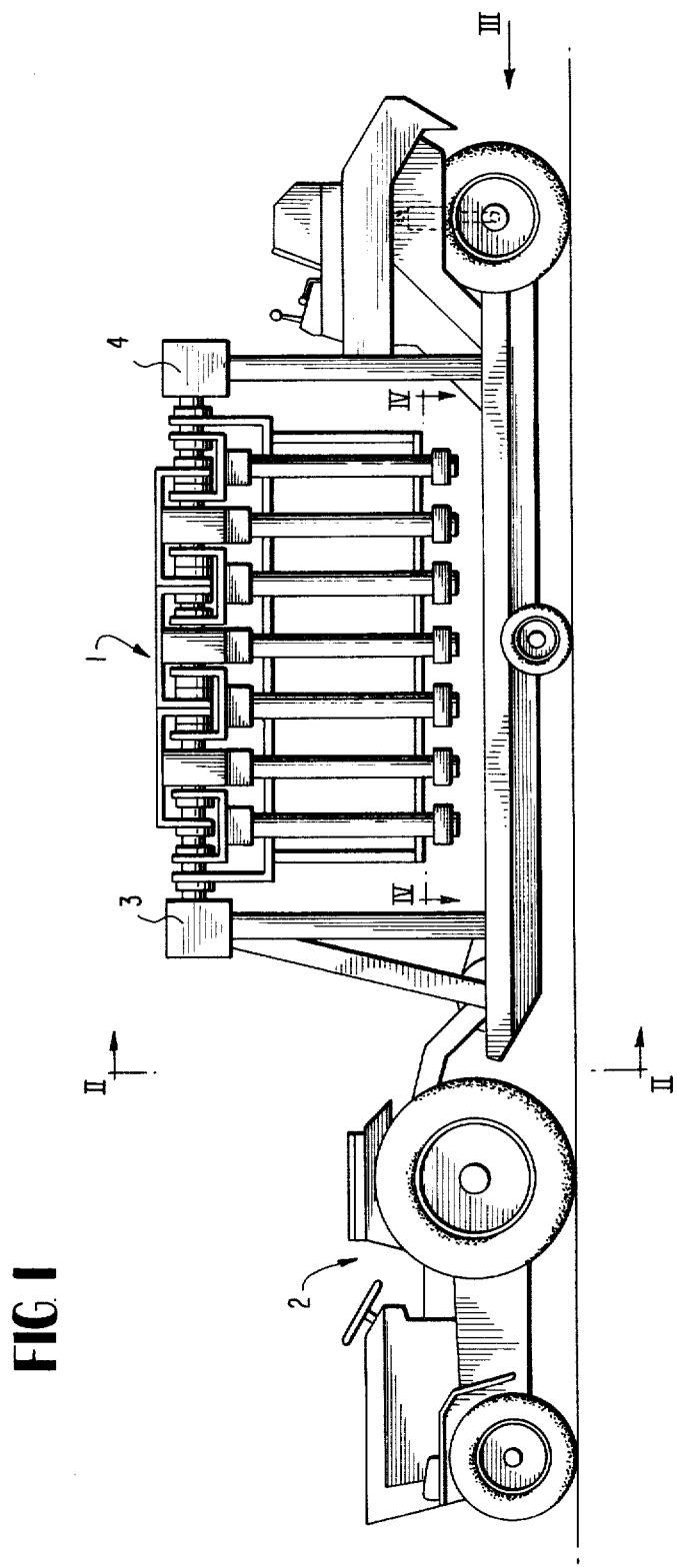
FIG. 1 is a side elevational view showing as a whole a grape gathering machine provided with the device according to the invention.
Figure 4:
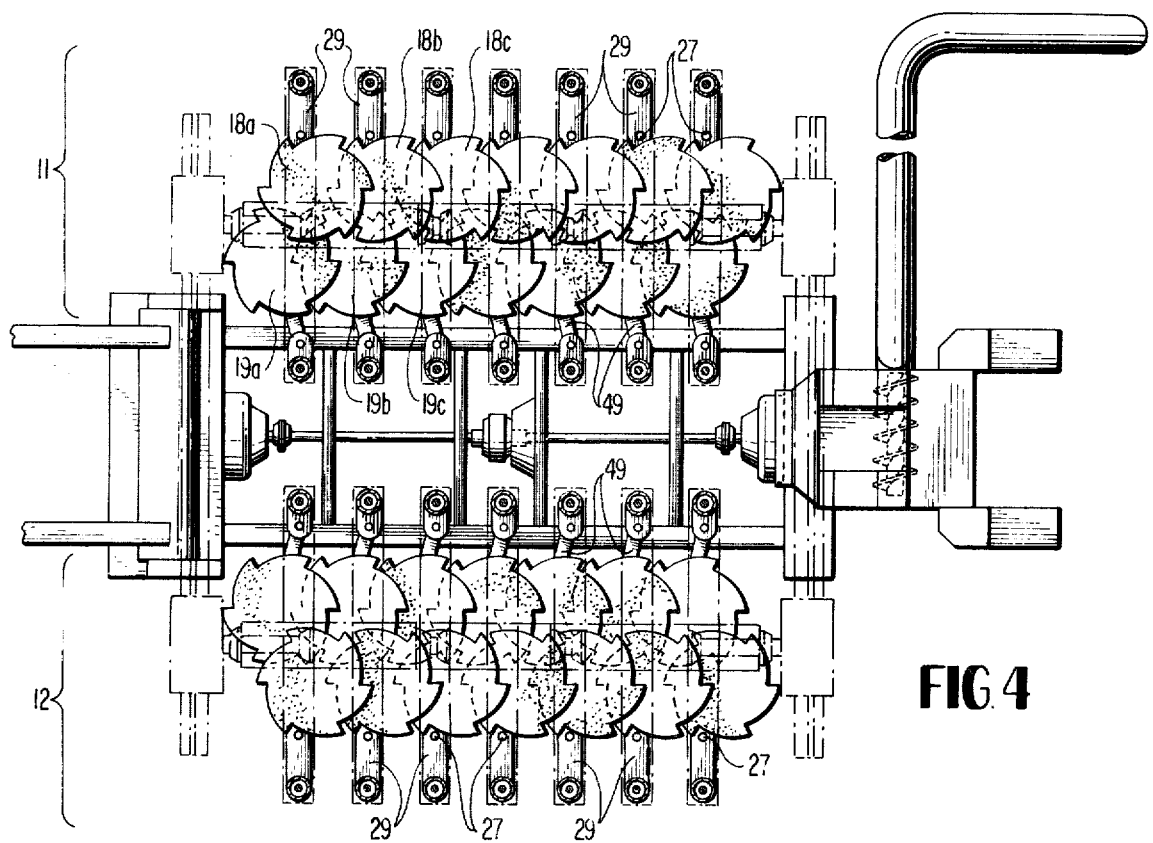
FIG. 4 is a plan sectional view along line IV—IV of FIG. 1, and shows the disposition of the sealing scales when the machine is at rest.

The drawings show a grape gathering machine 1, which is hauled along by an agricultural tractor 2. The machine 1 includes two transverse runways 3 and 4 disposed thereon at the front and at the rear, respectively, at several meters above the ground. Two travelling carriages 5 and 6 are disposed side by side on the front runway 3, and are adapted to move nearer to or away from each other (double arrow 86, FIG. 2). Two carriages 7 and 8 are provided likewise on the transverse runway 4 (FIG. 3).

The carriages 5 and 7 are interconnected by a longitudinal shaft 9 which defines a traveller from which swinging frames are hanging, which will be described later. The carriages 6 and 8 are interconnected likewise by a longitudinal shaft or traveller 10 from which swinging frames are hanging too.

The machine thus defines two tunnels or channels 11 and 12 (FIGS. 2 and 3) capable of gathering simultaneously the grapes of two rows of vine stocks 13 and 14.

Each tunnel or channel 11 or 12 is defined by swinging frames suspended from its shaft or traveller, 9 or 10, to wit:

swinging frames 15, which carry beater members 16 adapted to make the grapes fall from the vine stocks 13 or 14;

swinging frames 17, which carry tight fitting recovery scales such as 18 and 19, to receive the grapes plucked from the vine stock.

The present invention relates more particularly to said tight fitting recovery system 17, 18, 19.

Figure 7:
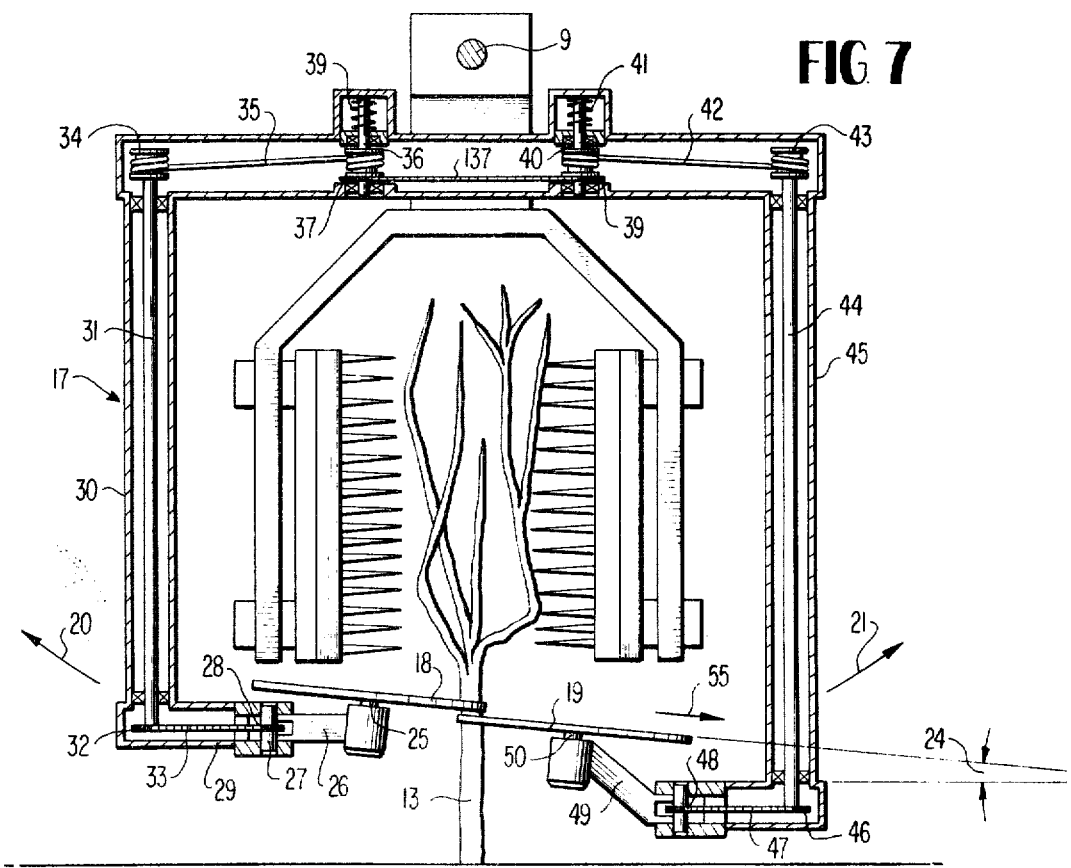
FIG. 7 is a view similar to FIG. 2, but on a larger scale, and showing the details of a recovery swing frame.

Each swinging frame 17 is able to swing freely with respect to the traveller 9 or 10 which carries it (FIG. 7, arrows 21 and 20).

Figure 8:
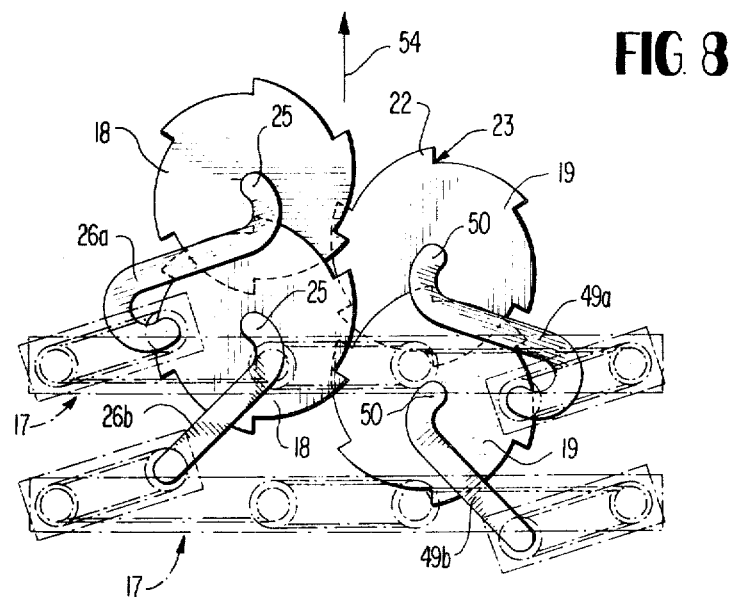
FIGS. 8 and 9 show two pairs of scales at the time they attack a vine stock correctly aligned on the axis of the machine, and a vine stock laterally shifted, respectively.
Figure 10:
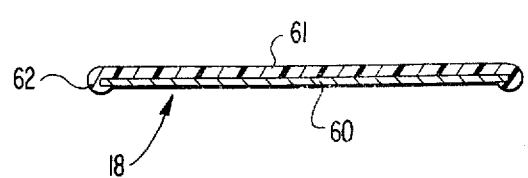
FIG. 10 is a sectional view of a representative disc showing the covering thereon.

Each scale 18 or 19 is constituted by a disk, the periphery of which is cut out so as to define notches. The shape of said disk, as seen in plan view, is similar to that of a ratchet wheel including six teeth 22. Each tooth takes up one sixth of the circumference. A notch 23 is defined at the bottom of each tooth (FIG. 8). The disk is preferably made of sheet steel, and is covered with a sheath of flexible material (plastics material, synthetic rubber, or the like). As best shown in FIG. 10 a representative disc 18 is comprised of a disc 60 of sheet steel having a resilient covering 61 with a protruding lip 62 which extends beyond the periphery of the disc 60.

In FIGS. 5 to 9, all the scales 18 of the right-hand side row of the tunnel 11 are indicated by the reference numbers 18a, 18b, 18c. The scales 19 of the left-hand-side row of the right-hand-side tunnel 12 are indicated by the reference numbers 19a, 19b, 19c.

Each swinging frame 17 supports a scale 18 and a scale 19. These two scales overlap each other slightly (FIG. 7) while remaining in the same plane, the latter being slightly inclined with respect to the horizontal. By way of example, the angle of inclination 24 (FIG. 7) may be equal to 6°.

The scale 18 rotates freely about a pin 25 carried by a swinging lever 26. The opposite end of the latter is integral with a pin 27, which is substantially vertical, and on which a pinion 28 is keyed. The pin 27 rotates within a bracket 29 fitted to the lower end of the right-hand arm 30 of the swinging frame 17. A vertical shaft 31 is adapted to rotate inside said arm 30, and the lower end of said shaft is integral with a pinion 32 and connected to the above-mentioned pinion 28 by an endless chain 33.

The upper end of the shaft 31 carries a drum 34 onto which one of the ends of a cable 35 is wound. The other end of said cable winds on another drum 36, the vertical axle of which is connected:

to a pinion 37, on the one hand, to a braking and elastic return system 38 of the kind known as "tumbler."

The pinion 37 is connected by an endless chain 137 to a further tumbler 39 provided on the drum 40 of a second tumbler 41. The latter is likewise connected by a cable 42 to a drum 43 provided on the upper end of a shaft 44 which rotates inside the vertical left-hand arm 45 of the swinging frame. The lower end of said shaft 44 carries a pinion 46 which is connected by an endless chain 47 to a pinion 48 integral with a swinging lever 49 which carries the pivot pin 50. It will be seen that, owing to this arrangement, if (FIG. 5) the machine attacks a vine stock 13a which is offset laterally by an amount 51 with respect to the mean axis 52 of the tunnel 11, the scale 18a presents a notch 23 against the foot of the stock 13a, and drifts to the right as indicated by the arrow 53 in FIG. 5. The opposite scale 19a also presents a notch 23 to the foot of the vine stock 13a, as a result of the rotation of the lever on which it is mounted and moves transversely in the same direction 53, and by the same amount 51. In other words, the two scales 18a and 19a accompany each other and keep the vine stock 13a clamped between them, while not hurting the latter, however.

Thus, the two disks or scales and the levers thereof are elastically returned to a median rest position, but if one of them is shifted laterally, the other one follows it, and then they accompany each other during the return motion. In this way, the swinging frame is able to move forward along a row of vines, the stocks of which are not accurately aligned: the swinging motion of the levers makes it possible to keep the space under the stocks closed, while admitting a faulty alignment within a substantial range, such as, for instance, 40 centimeters.

Figure 5:
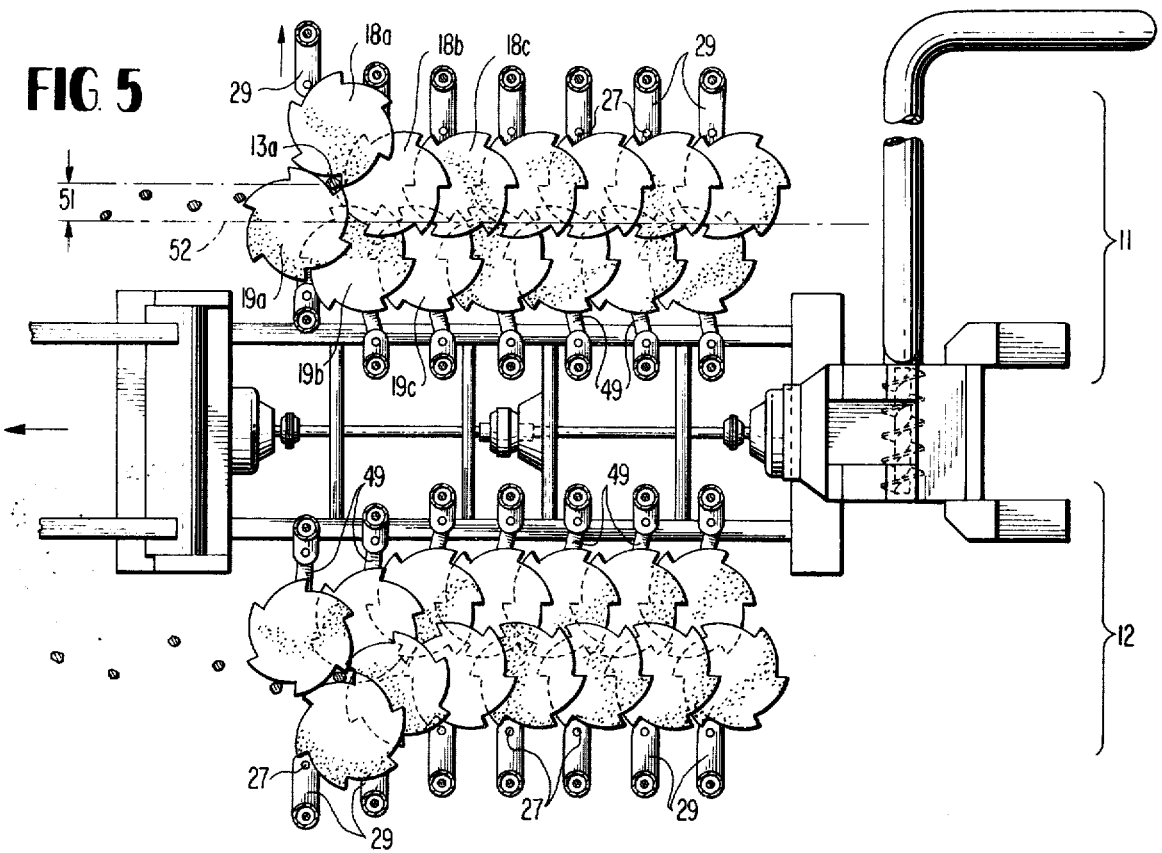
FIG. 5 is a view similar to FIG. 4, and shows the operation of the recovering scales when the machine reaches rows of vines, the stocks of which are not accurately aligned.

According to another feature of the invention, the levers 26 are alternately given S-shapes 26a and F-shapes 26b (FIG. 8), and the levers 49 are given similar shapes 49a and 49b, so that the pivots 25 and 50 for the rotation of the scales are staggered, as viewed when looking at the machine from top to bottom (FIGS. 5 and 8).

Owing to said arrangement, it will be noted too that two adjacent scales 18 not only overlap each other, but still overlap the scales of the next row 19. Thus, each foot of a vine stock (refer, for instance, to 13c, FIGS. 6 and 9), is trapped simultaneously in four notches 23 of four adjacent scales.

Figure 6:
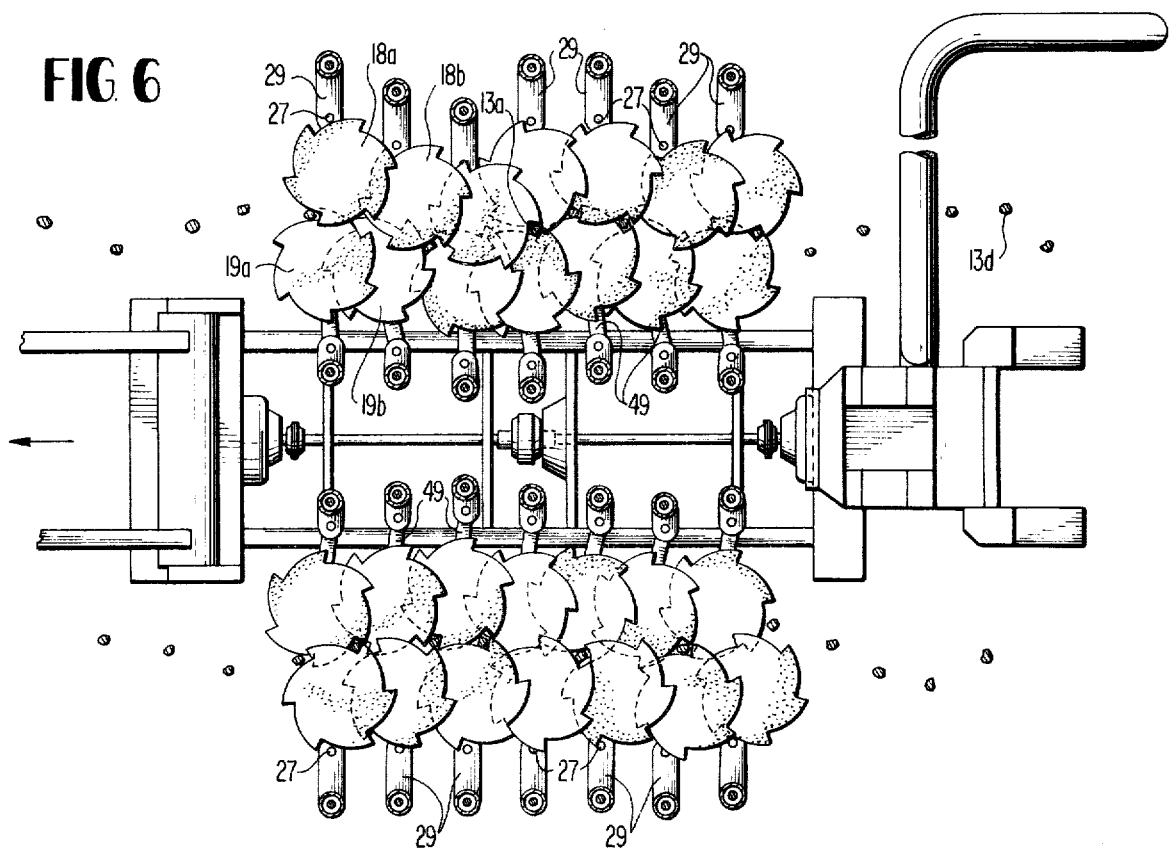
FIG. 6 is a similar view at the time the machine is operating on rows of vines.
Figure 9:
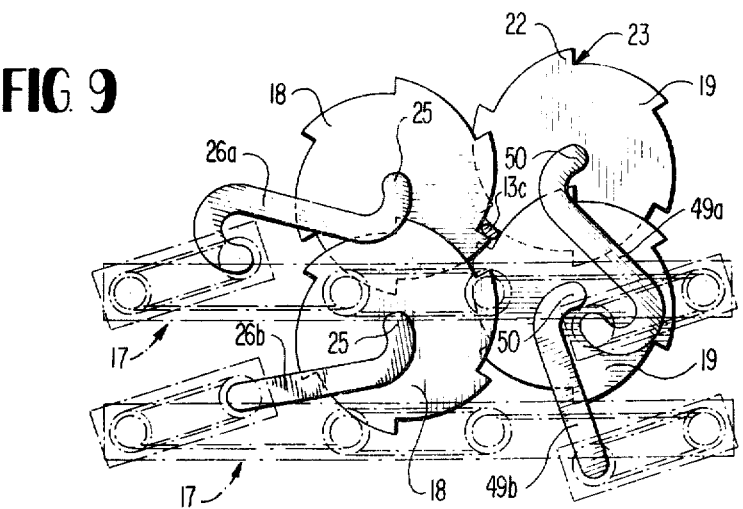

The operation is as follows:

When the grape gathering machine moves forward in the direcrion indicated by the arrow 54 (FIG. 8), the passing of the vine stocks 13 one by one between the scales 18 and 19 causes:

the swinging frames 17 to move in the direction of the arrow 20 or the arrow 21 (FIG. 7);

the levers 26 and 49 to rock, depending on whether the vine stock 13 concerned is either centred (position shown in FIG. 8) or off-set (position 13c in FIG. 9);

the scales 18 and 19 to rotate, which releases the vine stocks 13 behind the machine (see, for instance, the stock 13d in FIG. 6). During the operation, as will be seen from FIG. 6, the scales such as 18 and 19 are no longer aligned, as viewed when looking at the assembly from the top: their pattern fits exactly that of the stocks in the row of vines.

By selecting properly the tightness of the springs in the tumblers 38 and 41, it is possible to adjust the equilibration cable system.

It can be seen that the grapes plucked by the beater members 16 fall onto the scales 18 and 19 which, owing to their rotation and their dip with respect to the horizontal, discharge said grapes laterally, as indicated by the arrow 55 in FIG. 7.

I claim:

1. A grape and juice recovering device for a grape gathering machine comprising support means extending in the longitudinal direction of movement of said machine, at least one inverted U-shaped frame pivotally mounted on said support means for transverse movement with the lower ends of the two arms of the inverted U extending downwardly for disposition on opposite sides of a vine stock, a vertical pivot pin rotatably mounted on the lower end of each arm, a lever mounted on each pin at one end thereof, a freely rotatable disk mounted on the opposite end of each lever, said disks being disposed in overlapping relationship parallel to a common plane which is disposed at a slight inclination with respect to the horizontal, each of said disks having a plurality of peripheral notches for engaging a vine stock and transmission means interconnecting said levers for simultaneous movement in the same direction.

2. A recovering device as set forth in claim 1 wherein a transmission means includes a shaft mounted for rotation in each of said arms of said U-shaped frame means, sprocket and chain means interconnecting the lower end of each shaft and said vertical pivot pin, a pair of spaced aparat drums rotatably mounted on the cross bar of said inverted U-shaped frame means on opposite sides of said support means, braking and resilient return means operatively connected to each of said drums, cable means interconnecting each of said drums with an additional drum mounted on the upper end of each of said shafts, respectively, and chain and sprocket means interconnecting each of said drums.

3. A recovering device as set forth in claim 1 wherein a plurality of said frame means are pivotally supported from said support means in alignment with each other to define a tunnel adapted to pass over the top of a row of vines with the disks which are rotatably disposed on each frame means being disposed in overlapping relation with respect to each other.

4. A recovering device as set forth in claim 3 further comprising additional support means disposed parallel to said first mentioned support means and having a plurality of said frame means rotatably supported therefrom in alignment with each other to define a second tunnel adapted to pass over tops of a row of vines so that two rows of vines may be worked simultaneously.

5. A recovering device as set forth in claim 1 wherein each disk is comprised of a disk of sheet steel covered with a shock absorbing anti-friction material.

6. A recovering device as set forth in claim 5 wherein each disk is provided with six notches each of which is provided with a straight substantially radially extending wall and a curved wall interconnecting two adjacent straight walls to assist in guiding the vine stocks into the notches.

7. A recovering device as set forth in claim 6 wherein the centers of the disks on each frame means are longitudinally offset from each other so that four adjacent disks are adapted to embrace each vine stock during passing.

8. A recovering device as set forth in claim 7 wherein each disk is provided with a protruding lip of resilient material to ensure a close fit with the vine stock to assist in the perfect recovery of both grapes and juice.

* * * * *